United States Patent
Frankeny et al.

(10) Patent No.: US 6,522,613 B1
(45) Date of Patent: Feb. 18, 2003

(54) COMBINATION MEDIA AND MEDIA PLAYSTATION STORAGE UNIT

(76) Inventors: Richard Francis Frankeny, 2716 Barton Creek Blvd., #414, Austin, TX (US) 78735; Lisa Elena Brown, 2400 Cranberry Cove, Cedar Park, TX (US) 78613

( * ) Notice: Subject to any disclaimer, the term of this patent is extended or adjusted under 35 U.S.C. 154(b) by 0 days.

(21) Appl. No.: 09/478,293

(22) Filed: Jan. 5, 2000

Related U.S. Application Data (60) Provisional application No. 60/115,281, filed on Jan. 6, 1999.

(51) Int. Cl.[7] .......................... G11B 33/02; B65D 39/08; B65D 85/57
(52) U.S. Cl. ...................... 369/75.1; 224/199; 224/930; 206/701
(58) Field of Search .......................... D3/201, 204, 215, D3/218, 224, 283–287; 206/308.1, 310, 312, 579, 701; 224/578, 579, 197, 199, 929, 930, 646, 253, 241; 369/75.1, 292; 49/382; 16/230, 232; 312/324

(56) References Cited

U.S. PATENT DOCUMENTS

| | | | | |
|---|---|---|---|---|
| 3,665,991 A | * | 5/1972 | Gillemot et al. ............. 206/305 |
| 4,515,300 A | * | 5/1985 | Cohen ......................... 224/153 |
| 4,842,032 A | * | 6/1989 | Mastronardo ............... 150/113 |
| 4,848,624 A | * | 7/1989 | Clem .......................... 224/222 |
| 5,353,975 A | * | 10/1994 | Libertucci ................... 224/662 |
| 5,395,023 A | * | 3/1995 | Naymark et al. ........... 224/199 |
| 5,549,375 A | * | 8/1996 | Pagliaccio ............... 312/223.2 |
| D394,552 S | * | 5/1998 | Melk ............................ D3/287 |
| D394,579 S | * | 5/1998 | Kazanowski ................. D6/630 |
| 5,893,662 A | * | 4/1999 | Ito .............................. 399/107 |
| D409,378 S | * | 5/1999 | Lidsky ......................... D3/218 |
| 5,926,916 A | * | 7/1999 | Lee et al. ...................... 16/230 |
| 5,996,786 A | * | 12/1999 | McGrath ................. 206/308.1 |
| 6,006,915 A | * | 12/1999 | Moor .......................... 190/102 |
| D418,287 S | * | 1/2000 | Moor .......................... D3/201 |
| 6,056,174 A | * | 5/2000 | Minckler .................... 150/154 |
| D427,766 S | * | 7/2000 | Hillman ....................... D3/218 |
| D429,065 S | * | 8/2000 | Hillman ....................... D3/218 |
| D429,885 S | * | 8/2000 | Hillman ....................... D3/283 |
| D432,305 S | * | 10/2000 | Hillman ....................... D3/283 |
| D434,897 S | * | 12/2000 | Hillman ....................... D3/218 |
| D436,443 S | * | 1/2001 | Hillman ....................... D3/283 |
| 6,201,878 B1 | * | 3/2001 | Azima et al. ................ 181/142 |
| 6,345,751 B1 | * | 2/2002 | Elliot .......................... 224/640 |

\* cited by examiner

*Primary Examiner*—William Klimowicz
(74) *Attorney, Agent, or Firm*—Richard F. Frankeny; Winstead Sechrest & Minick P.C.

(57) ABSTRACT

The present invention discloses a combination media and media station storage unit for storing a multiplicity of media elements along with a media station for the media elements. The combination unit allows a media station to be stored and secured for protection while allowing connections for signals and allowing controls for the media station to be accessed while it is in a stored and secure position. The combination media and media station storage unit also has removable lids that may contain optional features for adding functionality to the combination media and media station storage unit. These features include but are not limited to speakers, electronics for remote broadcast of playback information, electronics for remote control of the media station, batteries, windows for observing media station status, etc. The combination unit also includes features for attaching a shoulder strap and a leg strap that enables a user to walk or jog while playing media and keeping the combination unit secure and stationary. The shoulder strap also has the audio cable for the headset integrated eliminating long headset cabling.

37 Claims, 11 Drawing Sheets

COMBINATION MEDIA AND MEDIA PLAYSTATION STORAGE UNIT

This application claims benefit of provisional application No. 60/115,281 filed Jan. 6, 1999.

TECHNICAL FIELD

The present invention relates in general to media storage units and in particular to media storage units with integrated space for storage of a media station where the media station may be operated while stored.

BACKGROUND INFORMATION

Media and especially media for recording music has changed significantly over the years. Early media included records, eight track magnetic tape, and cassettes. While portable media stations for cassettes are common place, combination storage units that can house both a media station and media storage may be bulky if very many units of media are included.

With the advent of compact discs (CDs), small media storage units can now store a considerable number of media elements. The small physical size of media for recoding information, for example the CD, has lead to the standardization of media for music, instructional, software and other data content. The CD format has been extended to both read only and read/write, further increasing the use of this media. Disc media other than CDS (e.g., mini Disc by Sony) which have the high density storage and small size have also been applied to music. Recently the introduction of the digital versatile disc (DVD), in the same physical size as the CD, has enabled video as content that can be played on small portable media stations. The fact that a standard, compact media size (DVD and CD) has emerged and the fact that all manner of content including; music, pictures, movies, data bases, software, games, etc., have become available on these media, has created a new paradigm in portability of players and storage devices. There is clearly a need for a combination media storage unit and media station that uses high density playable media. This combination unit will allow one to store and play a collection of these compact media while protecting both the media and the media station even during use or transport. Since most units that play a recordable media also record on the media, throughout this disclosure a media player and/or recorder are referred to as a media station.

SUMMARY OF THE INVENTION

The present invention discloses a combination storage unit for storing media and a corresponding like media station. The combination storage unit comprises a storage section for a media containing segmented storage features for storing and protecting each media element and a storage section for the media station which has features for housing and retaining a portable media station while having access features so the media station can be operated even when its storage section is closed and secured. Controls for opening the lid of the media station, volume control, receptacle for a battery and headsets, and the like are accessible when the media station is inside the combination storage unit. The combination storage unit in one embodiment, has removable lids. The combination storage unit may be fitted with a lid used for protection only or fitted with lids adapted with options. These option lids contain features that along with its protection function offer visual or operation functionality improvements for the combination storage unit. Option lids may contain, electronics, speakers, batteries, displays, and the like or windows for simply viewing operation of a media station. The combination media and media station storage unit is adapted for using special carrying straps, one for over the shoulder and one for securing the unit to a users leg so a media may be played and listened to while walking. The shoulder strap may also contain wiring and connectors for coupling to a headset and to the media station.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known elements have been shown in block diagram form in order not to obscure the present invention in unnecessary detail. For the most part, details concerning dimensional considerations and the like have been omitted in as much as such details are not necessary to obtain a complete understanding of the present invention and are within the skills of persons of ordinary skill in the relevant art.

The detailed explanation of embodiments of the present invention is done primarily using the compact disc (CD) media as an example. This is done because the CD physical format is the most popular high density media presently on the market and in volume production. However, it should be obvious to one skilled in the art that the Sony mini-disc format which uses MP3, Super Discs which are high density versions of the 3.5 inch diskette, and other media and media players or media stations may be used and still be within the scope of the present invention. Other media players or media stations that use high density memory cards, "sticks" or the like may also be used where the media is sufficiently portable and its data capacity is sufficient to hold desired program content for portable applications. The combination media and media station storage unit disclosed in this invention will be referred to as "COMBO" to simplify the text.

Refer now to the drawings wherein depicted elements are not necessarily shown to scale and wherein like or similar elements are designated by the same reference numeral through the several views.

Figure 1:
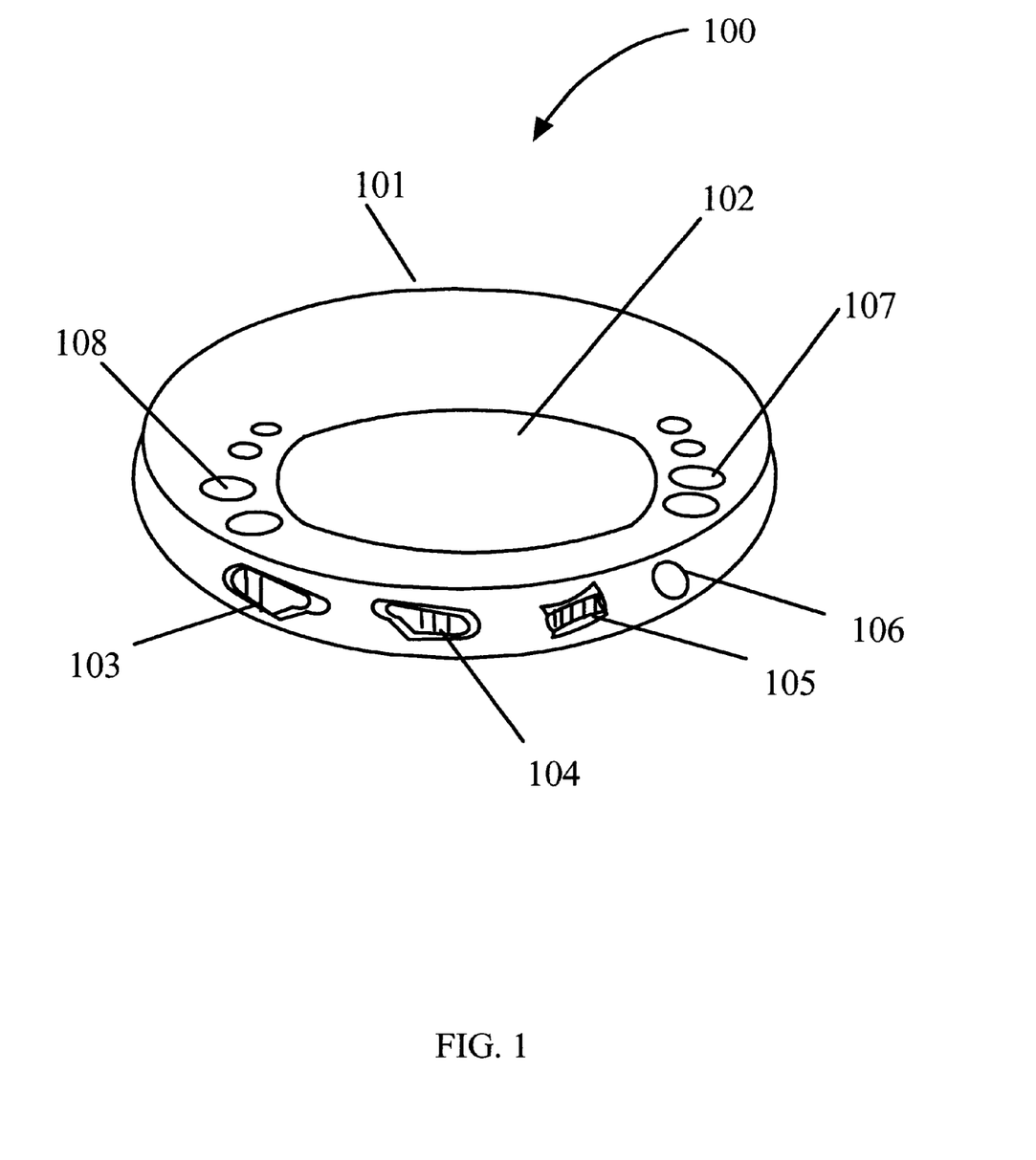
FIG. 1 is a illustration of a view of a portable media station.

FIG. 1 is a drawing illustrating a compact disc (CD) player or media station. The CD player has various controls buttons illustrated by exemplary buttons 107 and 108. These buttons may include a play, forward, reverse, mode etc. buttons. Typically a user will insert a CD, close the player lid and then push the play button. For the remainder of a play period the user will use the content, for example, an audio CD user may listen to recorded music. Some CD players have additional controls and connections necessary for operation. In this illustration, control 103 opens the lid, control 104 stops and resumes play, control 105 is a volume setting and connector 106 allows a user to connect a head set or remote powered speakers. While all CD players are not alike, FIG. 1 illustrates a typical type of a portable player having mechanical controls and electrical connections. Many CD players also have an external power input (not shown) for powering the CD player.

Figure 6:
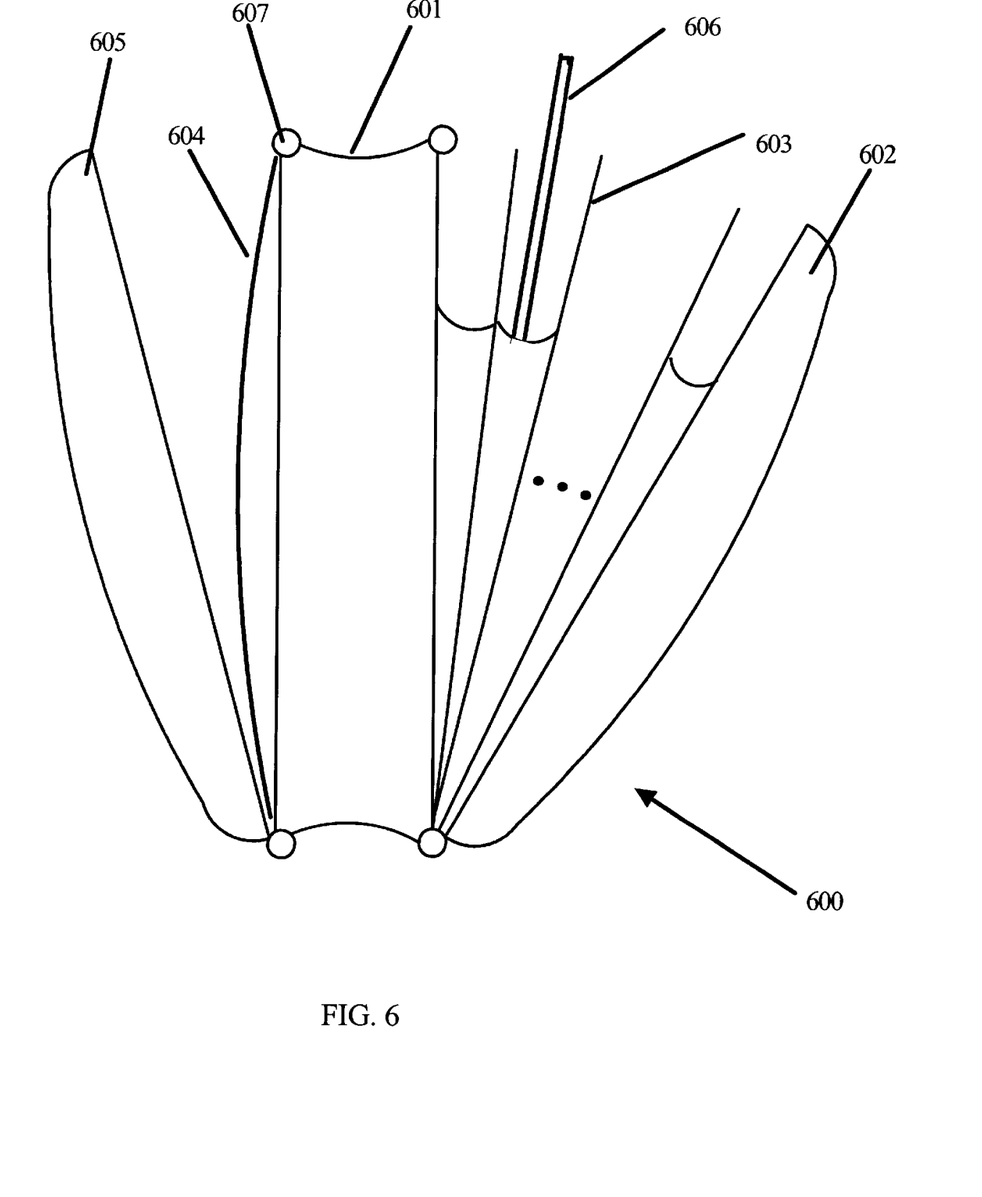
FIG. 6 is a view of the combination storage unit in one embodiment of the present invention, showing the lids open on both the media station and the media storage sections.

FIG. 6 is a drawing illustrating one embodiment of the present invention showing a side view of a combination media and media station storage unit (COMBO) 600 in a side view. The body 601 of the COMBO 600 has two back to back cavities, in one cavity a media station 604 is stored and in the other a media storage device 603 is stored. In this illustration, there is a lid 605 which may be closed to cover the media station 604 and a lid 602 that may be closed to cover the media storage device 603. An exemplary CD 606 is also shown stored in one of the segments of the media storage device 603.

Figures 3A, 3B:
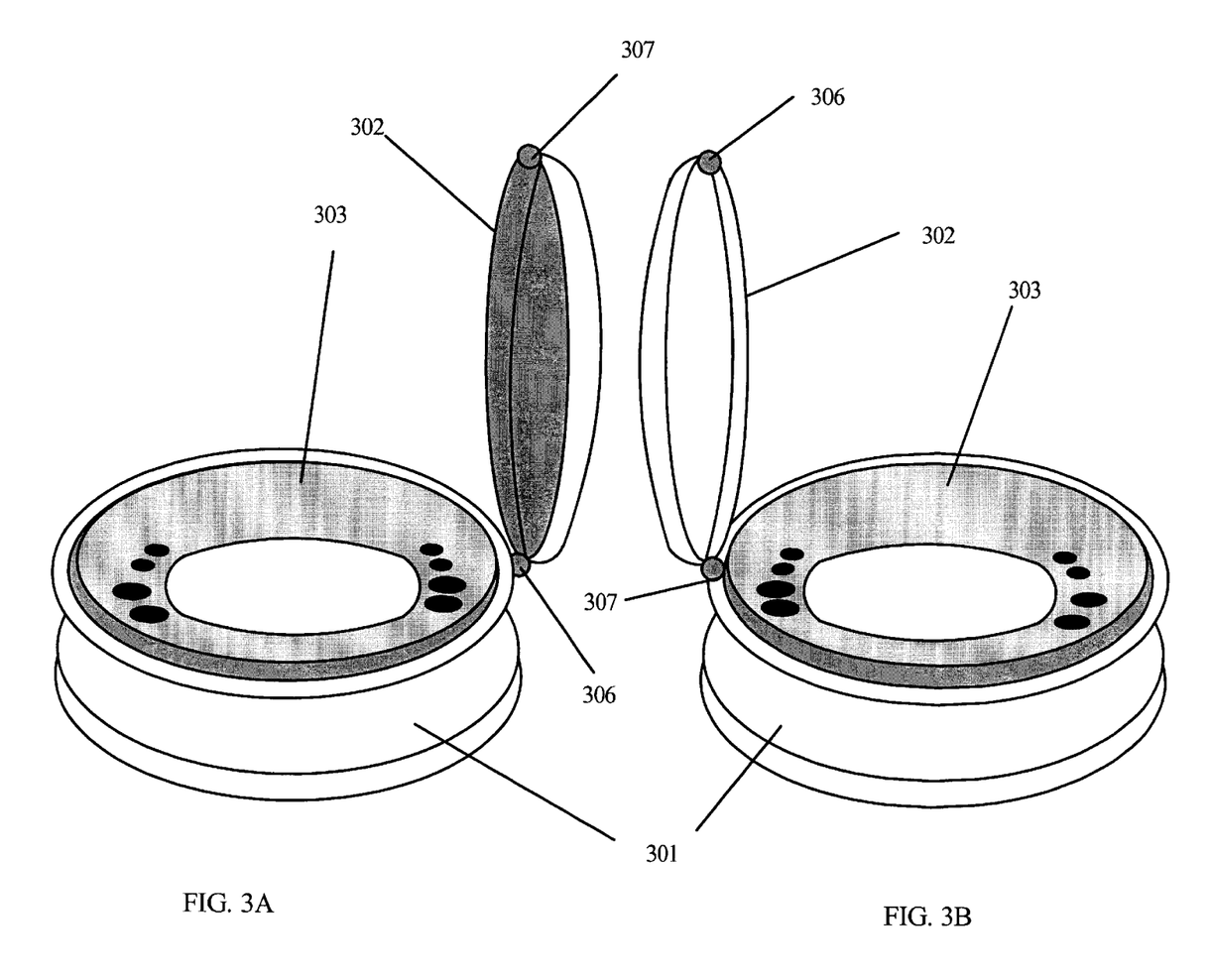
FIGS. 3A and 3B are drawings showing a combination storage unit with the lid for the media station storage section opened in both directions.

FIGS. 3A and 3B show views of one embodiment of the present invention where the lid 302 for the media station 303 may be opened in either direction. In this embodiment the lid 302 is secured to the body 301 using combination hinge/latches 306 and 307. Other embodiments of the present invention may employ a separate latch while a living hinge (not shown) is integrated as part of exemplary lid 302.

Figure 4:
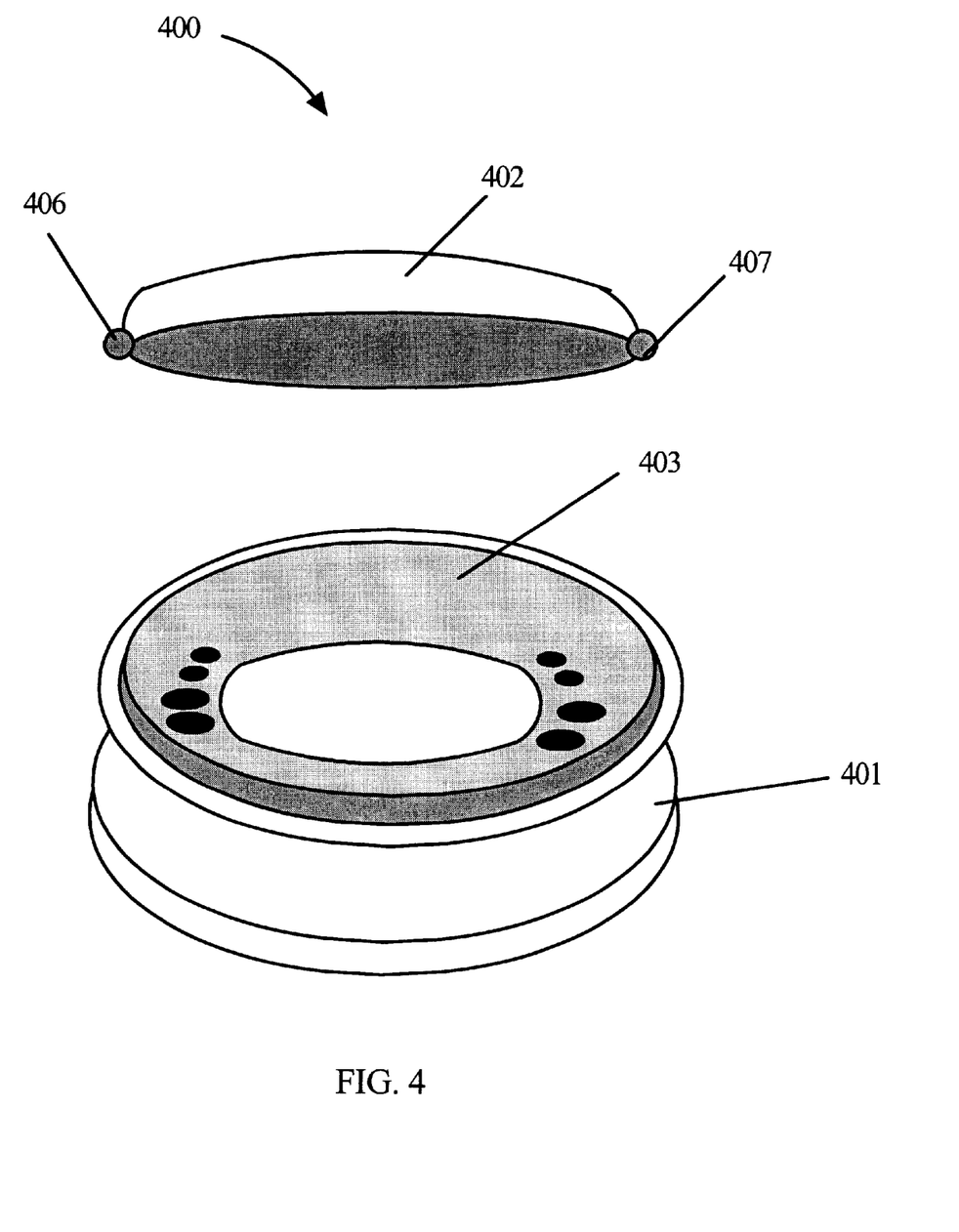
FIG. 4 is a drawing of a combination storage section, in one embodiment of the present invention, illustrating a media station storage section with the lid removed.

FIG. 4 illustrates one embodiment of the present invention where a COMBO 400 has combination hinge latches 406 and 407 which are both shown opened to allow the lid 402 to be removed from the body 401 of COMBO 400. This feature of a removable lid for the COMBO 400 allows easy access for removing a media station 403 which may be a stand alone portable player that may be used outside of the COMBO 400. The feature of a removable lid also allows one embodiment of the present invention in which a lid 402 is an "option" lid. In this embodiment, the lid 402 may have features that add to the functionality of the COMBO 400 The feature of an option lid will be explained further in later descriptions.

Figure 5:
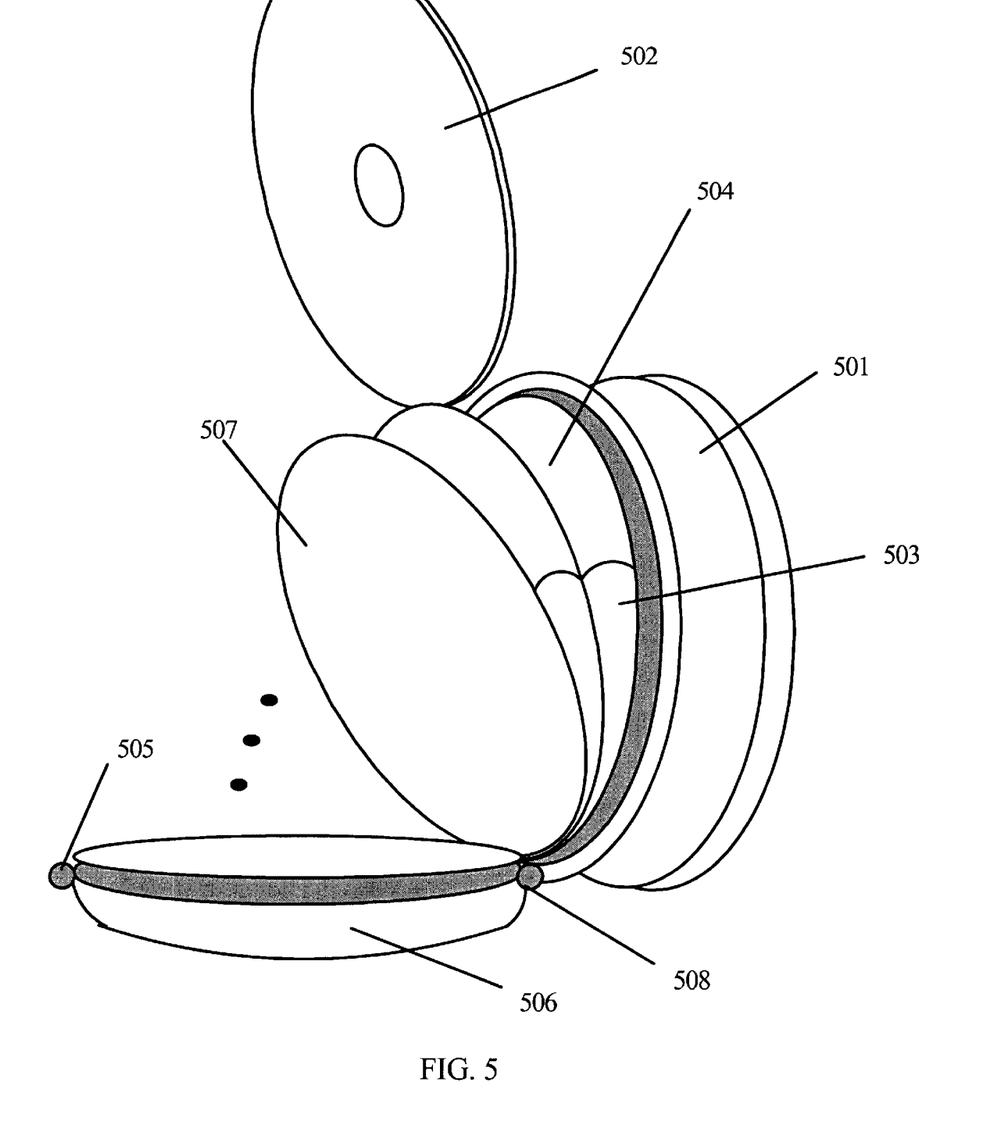
FIG. 5 is a drawing illustrating a media element being placed in a media storage device in one embodiment of the present invention.

FIG. 5 illustrates an embodiment of the present invention where the lid 506 is opened revealing a media storage device 507. In this embodiment, a multiplicity of pockets are created with webbing 503 allowing an exemplary CD 502 to be inserted and protected from other CDS (not shown). In one embodiment of the present invention the pockets 504 expand as the media storage section is opened exposing stored CDs for use. When lid 506 is closed and latched with latch 505 any stored CDs are secure and protected from the external environment.

Figure 10:
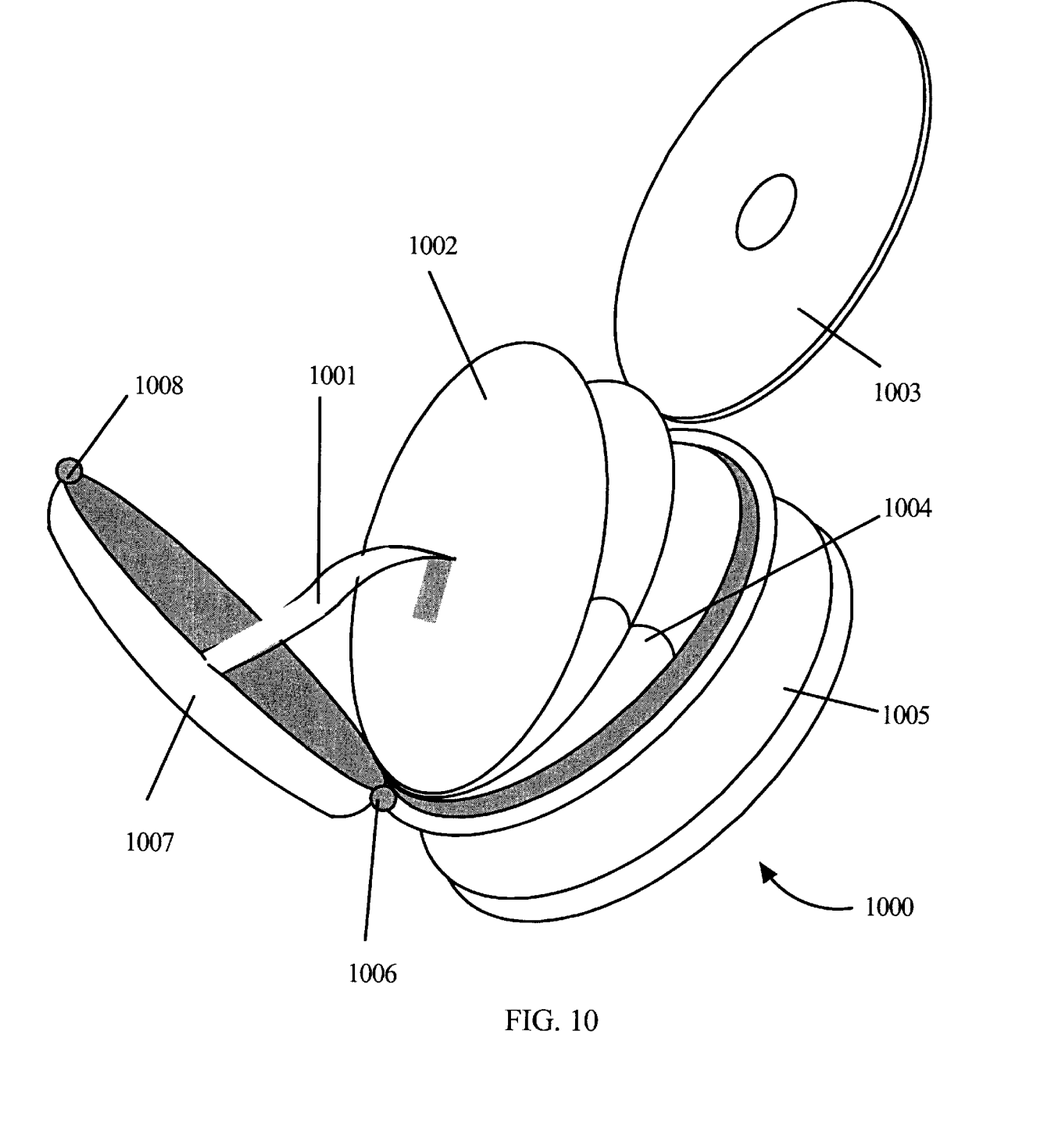
FIG. 10 is a combination storage unit, in one embodiment of the present invention, with an attachment device from a lid to a media storage device.

FIG. 10 illustrates one embodiment of the present invention where a strap 1001 is attached to both lid 1007 and media storage device 1002. In this embodiment, when the lid 1007 is opened the attachment strap 1001 will expand the pockets of storage device 1002 exposing an exemplary CD 1003 for use. Also in this embodiment the attachment strap 1001 is removable from both the lid 1007 and the media storage device 1002 This allows combination hinge/latches 1006 and 1008 to be used which will enable the lid 1007 to be removed from the unit. The lid 1007, in this embodiment, also could be an "option" lid. An option lid could be replaced by a user to change features of the COMBO 1000.

Figure 9A:
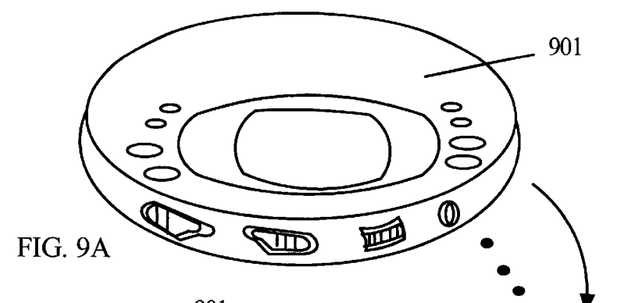
FIGS. 9A–9C are drawings showing a sequence of placing a media station into the media station section of the combination storage unit and showing openings used to access controls and to provide connection access.
Figure 9B:
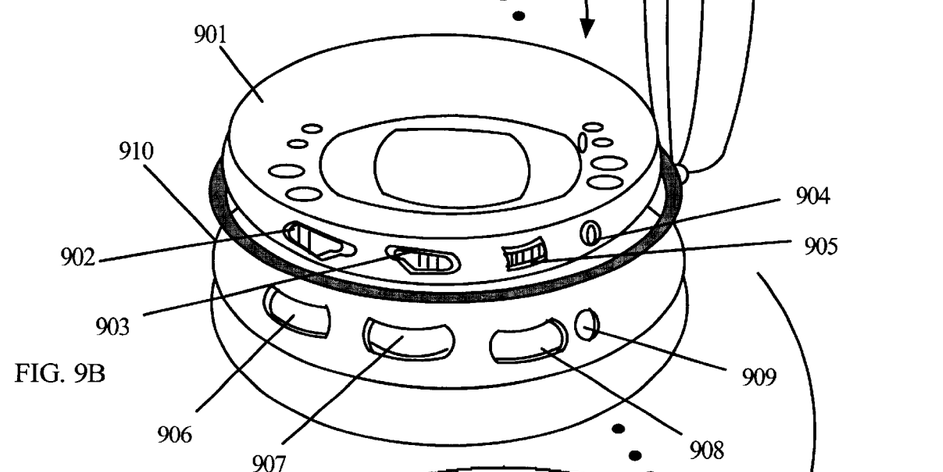
Figure 9C:
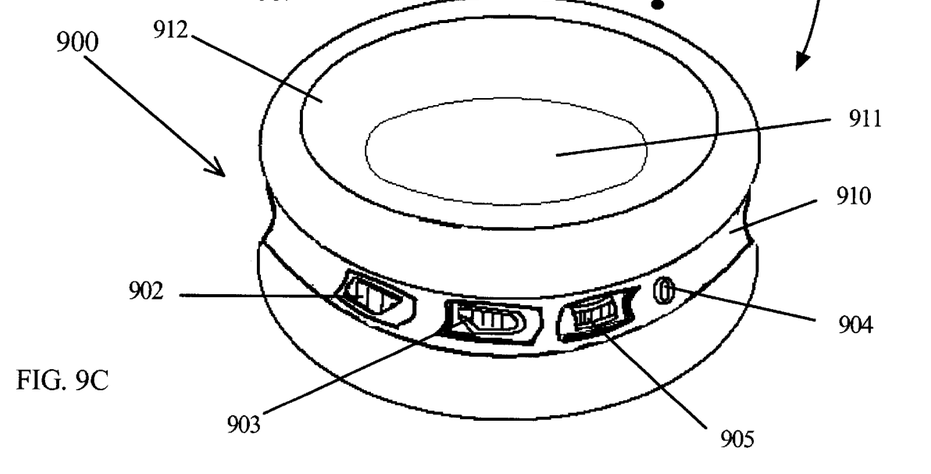

FIGS. 9A–9C illustrate various stages in operating one embodiment of the COMBO 900 in this invention. FIG. 9A shows an exemplary CD player 910, external to a COMBO 900, ready to be stored. In FIG. 9B, lid 912 is opened exposing the storage space for the exemplary CD player 910 which has been positioned just above the media station storage section in COMBO 900. In this embodiment of the present invention, the COMBO 900 has openings 906, 907, 908, and 909 that allow access to controls 902, 903, 905 and 904 respectively, when the lid 912 is closed and the CD player 901 has been stored. In FIG. 9C the COMBO 900 has been stored and the lid 912 has been closed. The controls 902, 903, 904 and 905 are operable through the opening in body 910 of COMBO 900. Lid 912, in this embodiment has a clear window 911 which allows status of CD player 901 to be observed when lid 912 is closed.

Figure 2:
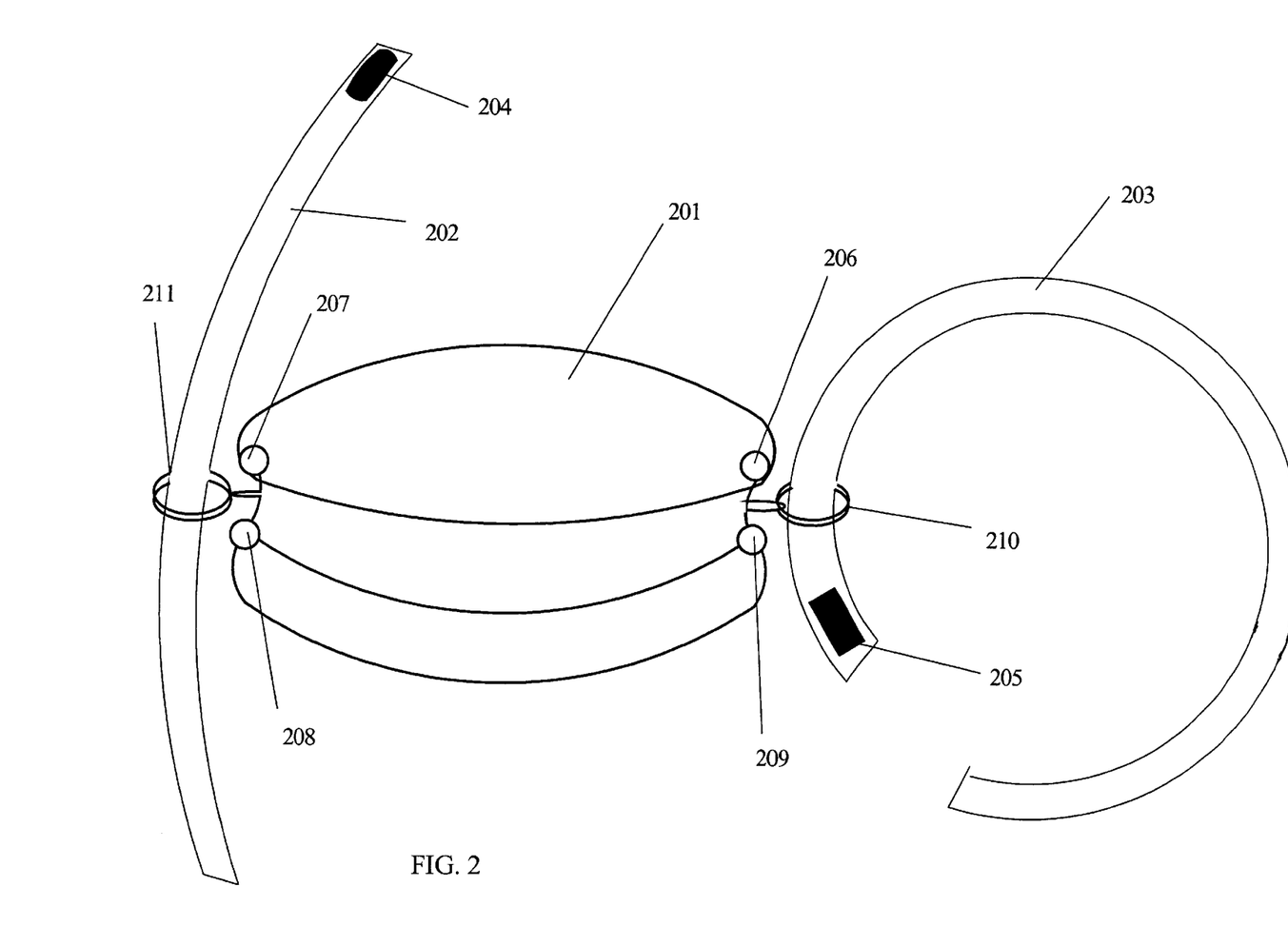
FIG. 2 is an drawing of a combination storage unit, in one embodiment of the present invention illustrating, a shoulder strap and a leg strap attachment.

FIG. 2 illustrates an embodiment of the present invention where attachment rings 210 and 211 are disposed through the body of COMBO 201 as shown. In this embodiment straps 202 and 203 may be passed through the rings 210 and 211 and secured, forming loops. Elements 204 and 205 illustrate Velcro, for example, used to secure the straps in loops.

Figure 11:
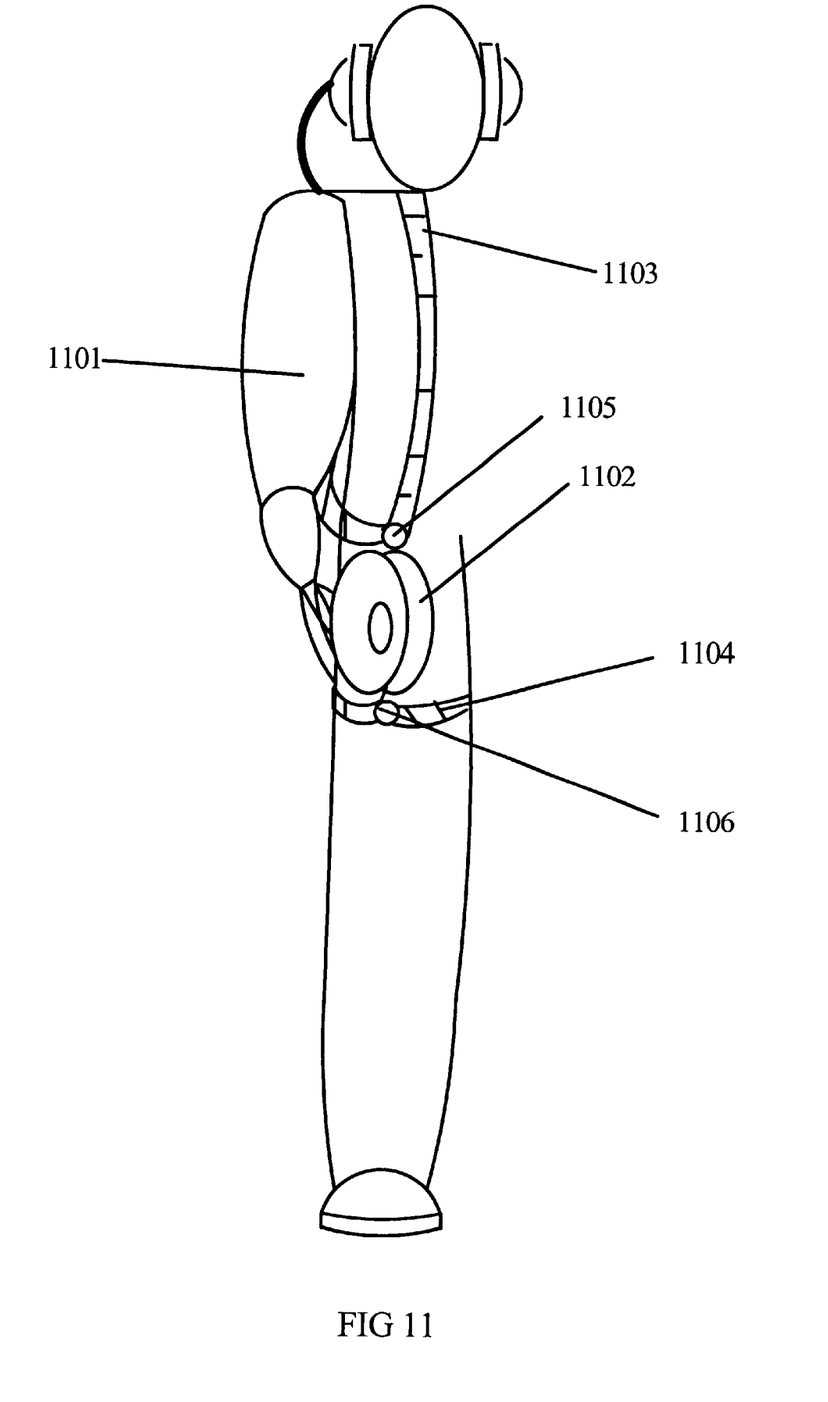
FIG. 11 is a illustration of a person using a combination storage, in one embodiment of the present invention, employing a shoulder strap and a leg strap.

FIG. 11 illustrates a person 1101 "wearing" exemplary COMBO 1102 using embodiment of the present invention. In this illustration, the strap 1103 acts as a shoulder strap and strap 1104 acts as a leg strap. Using the straps 1103 and 1104, in this fashion, allows a user to play a media in exemplary COMBO 1102 while walking or even jogging. The media station, in this embodiment should have skip protection. In another embodiment of the present invention, strap 1103 has an integrated audio cable (not shown) with connectors (not shown) for plugging into the head set jack of a CD player on the bottom end (toward the COMBO 1102) and another headset jack for plugging into a headset (not shown). In this embodiment, the audio cable on the headset may be short and therefore no long audio cable is needed to attach to a exemplary COMBO 1102.

In another embodiment of the present invention, an option lid contains connectors for coupling to a power source of the media station stored in a COMBO as well as coupling to electronics for wireless broadcasting of played content. The wireless broad cast may be received by compatible headsets or may be received by a remote unit that amplifies the signal and couples it to remote, powered speakers.

Figure 7:
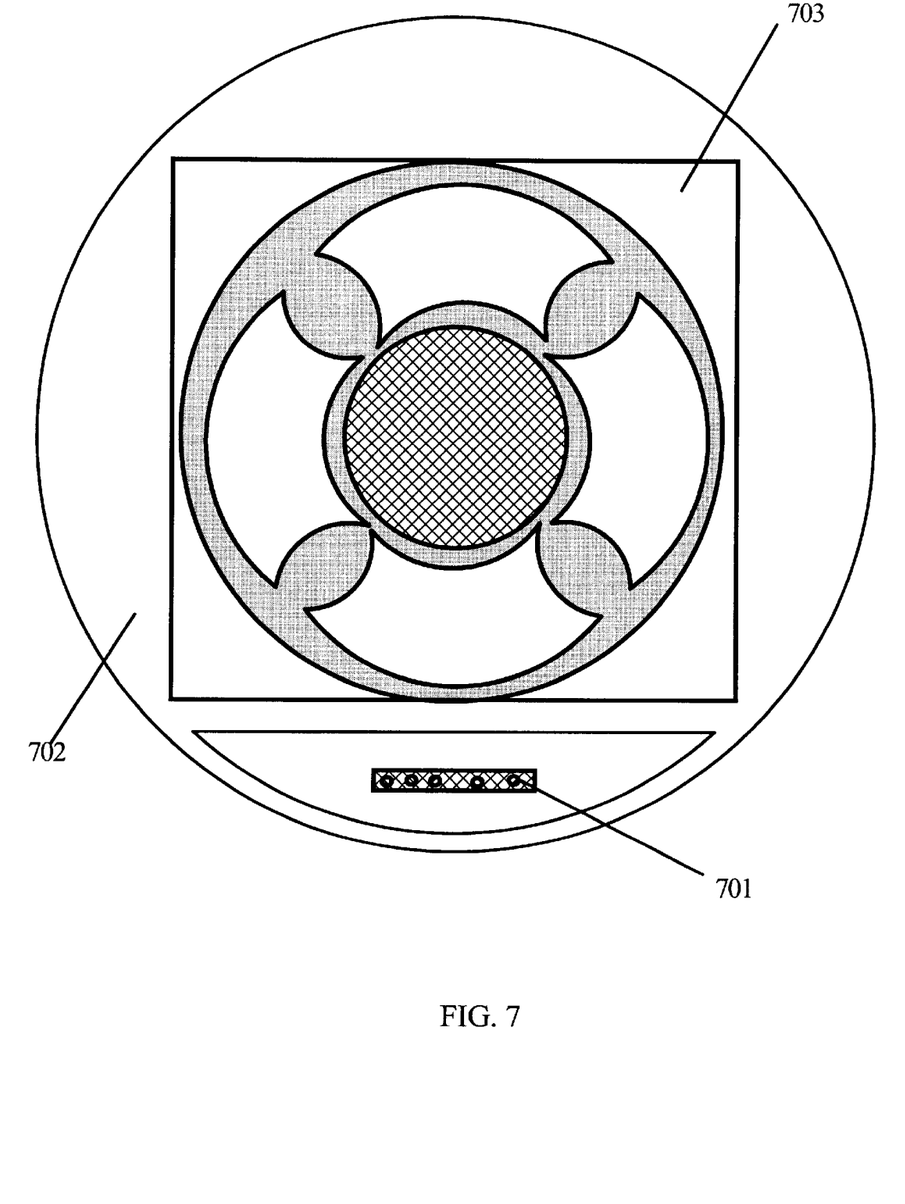
FIG. 7 is a view illustrating an option lid containing a speaker and a connector.

FIG. 7 illustrates one embodiment of the present invention where a connector 701 and a speaker 703 are integrated into an option lid 702. A mating connector (not shown) for connector 701 would be housed in one side of a COMBO (not shown). Lid 702 would also include electronics (not shown) for driving the exemplary speaker 703. Two such option lids could be employed, one on each side of a COMBO, to provide a complete portable system including a media station, media storage and electronics and a speaker for playback of content.

Figure 8:
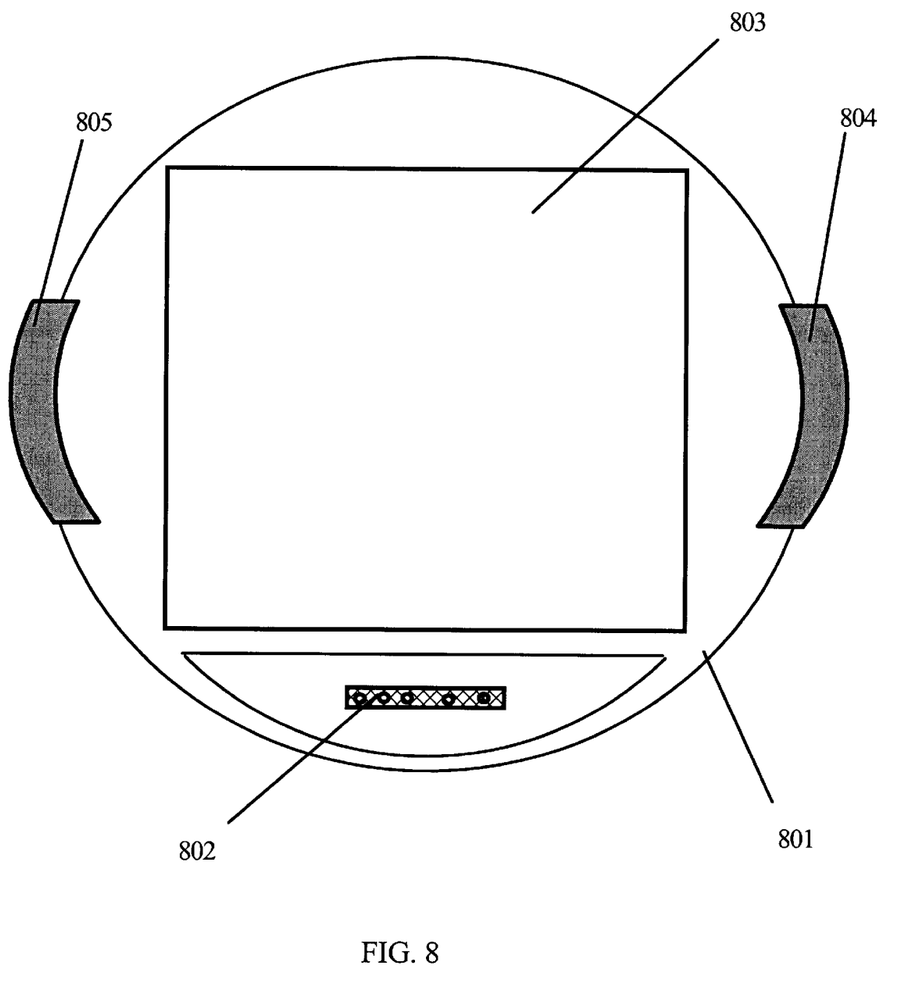
FIG. 8 is a view illustrating an option lid containing a display and a connector.

FIG. 8 illustrates another embodiment of the present invention where and option lid 801 incorporates a connector 802 and a video display 803, for example a liquid crystal display LCD. Since digital versatile discs (DVDS) are gaining in popularity and are the same size as CDS, the opportunity exists for a COMBO, in embodiments of the present invention, to be featured with an option lid with a display as illustrated in FIG. 8. Lid 801, in this drawing, has two hinge/latches illustrated by 804 and 805. A user could employ one option lid with a speaker and another with a display and have a self-contained video playback and video media storage unit Option lids may also include batteries for extended playing time. Other option lids could be used without departing from the scope of the present invention.

Although the present invention and its advantages have been described in detail, it should be understood that various changes, substitutions and alterations can be made herein without departing from the spirit and scope of the invention as defined by the appended claims.

What is claimed is:

1. A portable combination storage unit comprising:
a first storage unit adaptable for housing one or more media elements and a second storage unit connected to said first storage unit adaptable for housing a media station for said media elements, said media station operable for playing said media elements while housed in said second storage unit,
wherein said first storage unit comprises a first cavity, and a first lid, said first lid disposed to cover said first cavity of said first storage unit,
wherein said first lid comprises a covering section and opposing first hinge and first latch, said first lid pivoting about said first hinge to open and close said first lid and said first latch operable to secure said first lid from pivoting about said first hinge when in a locked position, and
wherein said first hinge has features that allow said first hinge to operate as either a hinge or a latch and said first latch has features that allow said first latch to operate as either a hinge or a latch.

2. The portable combination storage unit of claim 1 further comprising features allowing external devices to be coupled to said media station and allowing controls of said media station to be manipulated while said second storage unit is closed and secured protecting said media station.

3. The portable combination storage unit of claim 1, wherein said first storage unit is disposed back-to-back and opposing said second storage unit.

4. The portable combination storage unit of claim 1 wherein said first storage unit houses a media storage device, said media storage device further comprising features allowing said media storage device to be attached to and detached from said first lid.

5. The portable combination storage unit of claim 4, wherein said media storage device is expandable exposing segmented storage features for storing said media elements and compressible for storing within said first cavity.

6. The portable combination storage unit of claim 4, wherein said first lid is removable from said combination storage unit by opening said first latch, removing said first hinge and detaching said media storage device from said lid if attached.

7. The portable combination storage unit of claim 1, wherein said second storage unit comprises a second cavity, and a second lid, said second lid disposed to cover said second cavity of said second storage unit.

8. The portable combination storage unit of claim 7, wherein said second lid comprises a covering section and opposing second hinge and second latch, said second lid pivoting about said second hinge to open and close and said second latch operable to secure said lid from pivoting about said second hinge when in a locked position.

9. The portable combination storage unit of claim 7, wherein said media station further comprises features allowing said media station to be attached to and detached from a bottom of said second cavity, said media station removable from said second cavity.

10. The portable combination storage unit of claim 7, wherein said second cavity has features that enable said media station to be operable and enabling said media elements, once loaded into said media station, to be recorded or played in said media station when said second lid is closed.

11. The portable combination storage unit of claim 10, wherein said second cavity features comprise openings for manipulation of manual controls on said media station.

12. The portable combination storage unit of claim 11, wherein attachment elements are disposed so the openings for manipulation of manual controls face toward a user when said combination storage unit is hung from a user shoulder, said controls visible and operable.

13. The portable combination storage unit of claim 7, wherein said second cavity has features operable for allowing selective communication of record, play and control signals to said media station enabling said media elements, once loaded into said media station, to be recorded or played when said second lid is closed.

14. The portable combination storage unit of claim 13, wherein said second cavity features comprise openings allowing electrical connectors to mate.

15. The portable combination storage unit of claim 13, wherein said second cavity features comprise sections with optical transparency at selected optical frequencies for coupling signals to or from optical sensors on said media station.

16. The portable combination storage unit of claim 13, wherein said second cavity features comprise sections with electromagnetic transmissibility at selected frequencies for coupling transmitted electrical signals to or from said media station.

17. The portable combination storage unit of claim 7, wherein said second lid has features allowing observation of displays, said displays indicating status of said media station.

18. The portable combination storage unit of claim 1, said combination storage unit further comprising a first and a second attachment elements, said first attachment element for attaching a shoulder strap and said second attachment element for attaching a leg strap.

19. The portable combination storage unit of claim 18, wherein said shoulder strap comprises a strap for holding said combination storage unit and an integrated headset with a headset connector for electrically coupling a headset to said media station while said media station is stored and operable in said second storage unit of said combination storage unit.

20. The portable combination storage unit of claim 18, wherein said first and second attachment elements are diagonally disposed and allow said combination storage unit to be hung from a users shoulder and simultaneously strapped to said user's leg keeping said combination storage unit secured when said user is walking or jogging, allowing said user to play a recorded media element in said stored and operable media station.

21. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said first storage unit comprises a first cavity, and a first lid, said first lid disposed to cover said first cavity of said first storage unit,
   wherein said first lid comprises a covering section and opposing first hinge and first latch, said first lid pivoting about said first hinge to open and close said first lid and said first latch operable to secure said first lid from pivoting about said first hinge when in a locked position, and
   wherein said first hinge and said first latch are a combination hinge/latch.

22. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said second storage unit comprises a cavity, and a lid, said lid disposed to cover said cavity of said second storage unit,
   wherein said lid comprises a covering section and opposing hinge and latch, said lid pivoting about said hinge to open and close and said latch operable to secure said lid from pivoting about said hinge when in a locked position, and
   wherein said hinge has features that allow said hinge to operate as either a hinge or a latch and said latch has features that allow said latch to operate as either a hinge or a latch.

23. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said second storage unit comprises a cavity, and a lid, said lid disposed to cover said cavity of said second storage unit,
   wherein said lid comprises a covering section and opposing hinge and latch, said lid pivoting about said hinge to open and close and said latch operable to secure said lid from pivoting about said hinge when in a locked position, and
   wherein said hinge and said latch are combination hinge/latch units.

24. A portable combination storage unit comprising:
   a first storage unit adaptable for housing one or more media elements and a second storage unit connected to said first storage unit adaptable for housing a media station for said media elements said media station operable for playing said media elements while housed in said second storage unit,
   wherein said second storage unit comprises a cavity, and a lid, said lid disposed to cover said cavity of said second storage unit,
   wherein said lid comprises a covering section and opposing hinge and latch, said lid pivoting about said hinge to open and close and said latch operable to secure said lid from pivoting about said hinge when in a locked position, and
   wherein said lid is removable from said cavity.

25. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said second storage unit comprises a cavity, and a lid, said lid disposed to cover said cavity of said second storage unit,
   wherein said cavity has features operable for allowing selective communication of record, play and control signals to said media station enabling said media, once loaded into said media station, to be recorded or played when said lid is closed, and
   wherein said cavity features comprise optical pickup sensors for coupling signals to or from said media station.

26. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said second storage unit comprises a cavity, and a lid, said lid disposed to cover said cavity of said second storage unit,
   wherein said cavity has features operable for allowing selective communication of record, play and control signals to said media station enabling said media, once loaded into said media station, to be recorded or played when said lid is closed, and
   wherein said cavity features comprise sections for magnetic coupling, said magnetic coupling enabling controls to be manipulated by the force of a magnetic field.

27. A portable combination storage unit comprising:
   a first storage unit adaptable for housing one or more media elements and a second storage unit connected to said first storage unit adaptable for housing a media station for said media elements, said media station operable for playing said media elements while housed in said second storage unit,
   wherein said second storage unit comprises a cavity, and a lid, said lid disposed to cover said cavity of said second storage unit,
   wherein said cavity has features operable for allowing selective communication of record, play and control signals to said media station enabling said media, once loaded into said media station, to be recorded or played when said lid is closed, and wherein said cavity features comprise an antennae for coupling signals to or from said media station.

28. A portable combination storage unit comprising:

a first storage unit adaptable for housing one or more media elements and a second storage unit connected to said first storage unit adaptable for housing a media station for said media elements, said media station operable for playing said media elements while housed in said second storage unit, wherein said second storage unit comprises a cavity, and a second lid, said lid disposed to cover said cavity of said second storage unit, and wherein said lid may be removed and replaced selectively by one of a multiplicity of option lids, said option lids containing features operable to enhance the functionality of said media station.

29. The portable combination storage unit of claim 28, wherein said features of said option lid comprise, a speaker for broadcasting sound created from audio signals from said media station when playing said media elements.

30. The portable combination storage unit of claim 28, wherein said features of said option lid comprise a display screen for images generated by said media station when playing said media elements.

31. The portable combination storage unit of claim 28, wherein said features of said option lid comprise a transmitter, receiver or transceiver for controlling said media station or sending playback signals to and from said media station.

32. The portable combination storage unit of claim 28, wherein said option lid further comprises connectors for electrically coupling signals to and from said media station stored in said seeend cavity.

33. The portable combination storage unit of claim 28, wherein said option lid further comprises connectors for electrically coupling signals to and from said media station stored in said cavity.

34. A portable combination storage unit comprising:

a first storage unit adaptable for housing one or more media elements and a second storage unit connected to said first storage unit adaptable for housing a media station for said media elements, said media station operable for playing said media elements while housed in said second storage unit, wherein said first storage unit comprises a first cavity, and a first lid, said first lid disposed to cover said first cavity of said first storage unit, and wherein said first lid may be removed and replaced selectively by one of a multiplicity of option lids, said option lids containing features operable to enhance the functionality of said media station.

35. The portable combination storage unit of claim 34, wherein said features of said option lid comprise, a speaker for broadcasting sound created from audio signals from said media station when playing said media.

36. The portable combination storage unit of claim 34, wherein said features of said option lid comprise a display screen for images generated by said media station when playing said media elements.

37. The portable combination storage unit of claim 34, wherein said features of said option lid comprise a transmitter, receiver or transceiver for controlling said media station or sending playback signals to and from said media station.

* * * * *